(12) United States Patent
Chung et al.

(10) Patent No.: US 9,361,916 B1
(45) Date of Patent: Jun. 7, 2016

(54) ELECTRICAL LAPPING GUIDE FOR DIMENSIONAL CONTROL OF BACK SIDE OF HEAT ASSISTED MAGNETIC RECORDING DEVICE

(71) Applicant: Western Digital (Fremont), LLC, Fremont, CA (US)

(72) Inventors: Luc Ving Chung, Fremont, CA (US); Steven C. Rudy, San Jose, CA (US); Nurul Amin, Fremont, CA (US)

(73) Assignee: Western Digital (Fremont), Fremont, CA (US)

( * ) Notice: Subject to any disclaimer, the term of this patent is extended or adjusted under 35 U.S.C. 154(b) by 0 days.

(21) Appl. No.: 14/287,586

(22) Filed: May 27, 2014

Related U.S. Application Data

(60) Provisional application No. 61/952,671, filed on Mar. 13, 2014.

(51) Int. Cl.
*G11B 5/127* (2006.01)
*G11B 5/48* (2006.01)
*B24B 37/04* (2012.01)
*G11B 5/31* (2006.01)
*G11B 5/60* (2006.01)
*G11B 5/00* (2006.01)

(52) U.S. Cl.
CPC ............ *G11B 5/4866* (2013.01); *B24B 37/048* (2013.01); *G11B 5/3169* (2013.01); *G11B 5/6082* (2013.01); *G11B 5/6088* (2013.01); *G11B 2005/0021* (2013.01)

(58) Field of Classification Search
CPC ............... G11B 5/6082; G11B 5/6088; G11B 2005/0021; G11B 5/3169

USPC .............. 369/13.24, 13.32, 13.33; 360/234.3, 360/234.5, 246.2, 123.1, 316
See application file for complete search history.

(56) References Cited

U.S. PATENT DOCUMENTS

| | | |
|---|---|---|
| 5,755,612 A | 5/1998 | Schaenzer et al. |
| 6,074,283 A * | 6/2000 | Maeda ................... B24B 37/00 451/5 |
| 6,075,673 A | 6/2000 | Wilde et al. |
| 6,097,575 A | 8/2000 | Trang et al. |
| 6,125,014 A | 9/2000 | Riedlin, Jr. |
| 6,125,015 A | 9/2000 | Carlson et al. |
| 6,130,863 A | 10/2000 | Wang et al. |
| 6,137,656 A | 10/2000 | Levi et al. |
| 6,144,528 A | 11/2000 | Anaya-Dufresne et al. |
| 6,147,838 A | 11/2000 | Chang et al. |
| 6,151,196 A | 11/2000 | Carlson et al. |
| 6,178,064 B1 | 1/2001 | Chang et al. |
| 6,181,522 B1 | 1/2001 | Carlson |
| 6,181,673 B1 | 1/2001 | Wilde et al. |
| 6,229,672 B1 | 5/2001 | Lee et al. |
| 6,236,543 B1 | 5/2001 | Han et al. |

(Continued)

*Primary Examiner* — Thomas Alunkal

(57) ABSTRACT

A slider bar apparatus, and a method for lapping a back side surface of the slider bar, is provided. The slider bar includes a head part and a pair of sliders separated by the head part. Each of the sliders has an air bearing surface (ABS) and a back side surface opposite the ABS. Each of the sliders has a reader element and a writer element of a magnetic head for use in a magnetic hard disk drive. An electrical lapping guide is mounted on the back side surface and has a pair of terminals and a conductive material extending between the terminals. The conductive material is arranged on the slider bar such that the resistance between the terminals increases during a lapping of the back side of the sliders.

19 Claims, 4 Drawing Sheets

(56) References Cited

U.S. PATENT DOCUMENTS

| | | |
|---|---|---|
| 6,246,547 B1 | 6/2001 | Bozorgi et al. |
| 6,249,404 B1 | 6/2001 | Doundakov et al. |
| 6,330,131 B1 | 12/2001 | Nepela et al. |
| 6,339,518 B1 | 1/2002 | Chang et al. |
| 6,347,983 B1* | 2/2002 | Hao .................. B24B 37/04 29/603.09 |
| 6,349,017 B1 | 2/2002 | Schott |
| 6,373,660 B1 | 4/2002 | Lam et al. |
| 6,378,195 B1 | 4/2002 | Carlson |
| 6,522,504 B1 | 2/2003 | Casey |
| 6,538,850 B1 | 3/2003 | Hadian et al. |
| 6,583,953 B1 | 6/2003 | Han et al. |
| 6,646,832 B2 | 11/2003 | Anaya-Dufresne et al. |
| 6,661,612 B1 | 12/2003 | Peng |
| 6,665,146 B2 | 12/2003 | Hawwa et al. |
| 6,690,545 B1 | 2/2004 | Chang et al. |
| 6,704,173 B1 | 3/2004 | Lam et al. |
| 6,708,389 B1 | 3/2004 | Carlson et al. |
| 6,717,773 B2 | 4/2004 | Hawwa et al. |
| 6,721,142 B1 | 4/2004 | Meyer et al. |
| 6,744,599 B1 | 6/2004 | Peng et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,856,489 B2 | 2/2005 | Hawwa et al. |
| 6,873,496 B1 | 3/2005 | Sun et al. |
| 6,884,148 B1 | 4/2005 | Dovek et al. |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 6,994,608 B1* | 2/2006 | Tzeng .................. G11B 5/6005 451/5 |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,174,622 B2 | 2/2007 | Meyer et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,551,406 B1* | 6/2009 | Thomas .................. G11B 5/102 360/317 |
| 7,554,767 B1 | 6/2009 | Hu et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,729,089 B1 | 6/2010 | Hogan |
| 7,995,307 B2 | 8/2011 | Zheng |
| 7,995,310 B1 | 8/2011 | Pan |
| 8,024,748 B1 | 9/2011 | Moravec et al. |
| 8,081,400 B1 | 12/2011 | Hu |
| 8,087,973 B1 | 1/2012 | Sladek et al. |
| 8,089,730 B1 | 1/2012 | Pan et al. |
| 8,164,858 B1 | 4/2012 | Moravec et al. |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,256,272 B1 | 9/2012 | Roajanasiri et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,471,579 B2 | 6/2013 | Liu |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,501,536 B2 | 8/2013 | Mooney et al. |
| 8,514,522 B1 | 8/2013 | Pan et al. |
| 8,518,748 B1 | 8/2013 | Wang et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1* | 7/2014 | Wang .................. G03F 7/70633 356/399 |
| 8,792,212 B1 | 7/2014 | Pan et al. |
| 8,792,213 B1 | 7/2014 | Vijay et al. |
| 8,797,691 B1 | 8/2014 | Tian et al. |
| 2002/0066177 A1* | 6/2002 | Takada .................. G11B 5/3173 29/603.07 |
| 2003/0021069 A1* | 1/2003 | Crawforth .................. G11B 5/60 360/234.3 |
| 2003/0026046 A1* | 2/2003 | Yamakura .................. G11B 5/3173 360/316 |
| 2005/0185345 A1* | 8/2005 | Ding .................. G11B 5/3912 360/319 |
| 2006/0023333 A1* | 2/2006 | Hachisuka .................. B82Y 10/00 360/66 |
| 2006/0028770 A1* | 2/2006 | Etoh .................. G11B 5/1278 360/313 |
| 2006/0044689 A1* | 3/2006 | Lille .................. G11B 5/102 360/234.5 |
| 2007/0177305 A1* | 8/2007 | Araki .................. G11B 5/3166 360/234.5 |
| 2010/0073802 A1* | 3/2010 | Komura .................. G11B 5/314 360/59 |
| 2010/0077600 A1* | 4/2010 | Seki .................. G11B 5/3166 29/603.09 |
| 2012/0075966 A1* | 3/2012 | Tomikawa .................. G11B 5/1278 369/13.33 |
| 2013/0244541 A1 | 9/2013 | Yaemglin et al. |
| 2013/0293982 A1 | 11/2013 | Huber |
| 2014/0154952 A1* | 6/2014 | Druist .................. G11B 5/4853 451/1 |

* cited by examiner

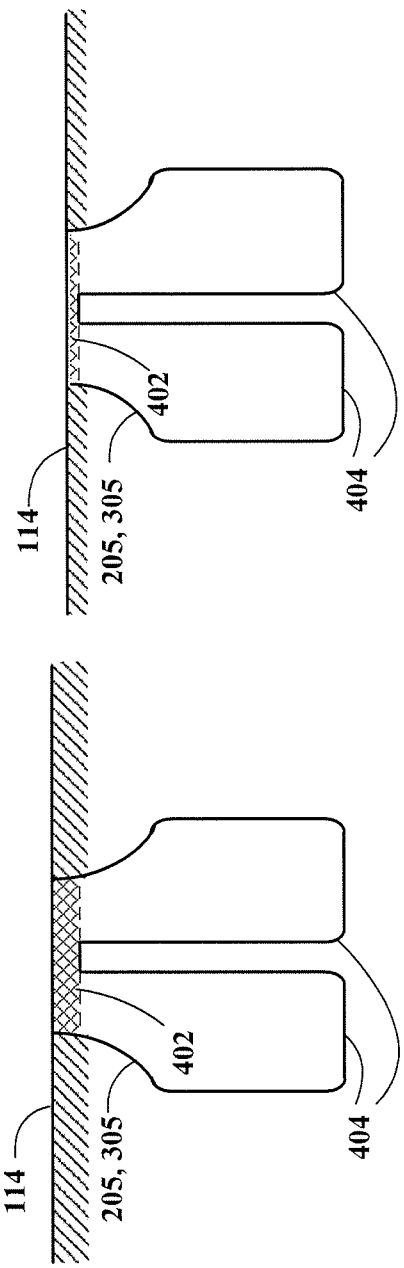

ELECTRICAL LAPPING GUIDE FOR DIMENSIONAL CONTROL OF BACK SIDE OF HEAT ASSISTED MAGNETIC RECORDING DEVICE

CROSS-REFERENCE TO RELATED APPLICATION

This application claims the benefit of U.S. Provisional Application Ser. No. 61/952,671, filed on Mar. 13, 2014, which is expressly incorporated by reference herein in its entirety.

BACKGROUND

In magnetic storage devices such as hard disk drives (HDD), read and write heads are used to magnetically read and write information to and from storage media, such as a magnetic storage disk. A HDD may include a rotary actuator, a suspension mounted on an arm of the rotary actuator, and a slider bonded to the suspension to form a head gimbal assembly. In a traditional HDD, the slider carries a write head and read head, and radially flies over the surface of the storage media.

A Heat Assisted Magnetic Recording (HAMR) device is an enhanced HDD that applies heat to magnetically soften the media surface during recording, particularly useful for high capacity storage with physically smaller bit sizes. The heat may be generated by a laser coupled to a waveguide and a transducer formed on the slider. The slider is a base on which the read and write heads are mounted on a trailing edge surface that is perpendicular to the air bearing surface (ABS). The magnetic media surface is exposed to the ABS during read and write operation. The waveguide extends through the back side of the slider and is directly coupled to a laser from an external source. A lap-and-look lapping process performed on the back side of the slider during fabrication of the HAMR device may not consistently provide optimum control of the dimension between the waveguide with respect to the back side surface of the slider for coupling the waveguide to the laser.

BRIEF DESCRIPTION OF THE DRAWINGS

Various embodiments will now be presented in the detailed description by way of example, and not by way of limitation, with reference to the accompanying drawings, wherein:

FIGS. 4A and 4B illustrate a time lapse for lapping a back side surface using an electrical lapping guide.

DETAILED DESCRIPTION

Figure 1:
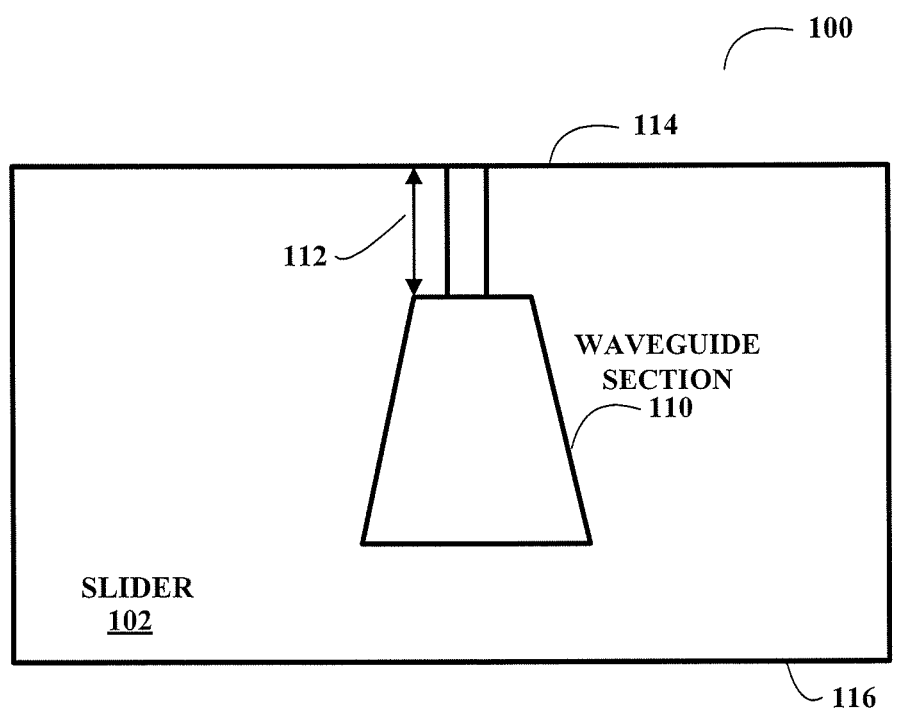
FIG. 1 shows a top view schematic diagram of a waveguide section on a read/write slider and the critical dimension at the back side surface of the slider for lapping.

The various exemplary embodiments illustrated in the drawings may not be drawn to scale. Rather, the dimensions of the various features may be expanded or reduced for clarity. In addition, some of the drawings may be simplified for clarity. Thus, the drawings may not depict all of the components of a given apparatus or method.

Various embodiments will be described herein with reference to drawings that are schematic illustrations of idealized configurations. As such, variations from the shapes of the illustrations as a result of manufacturing techniques and/or tolerances, for example, are to be expected. Thus, the various embodiments presented throughout this disclosure should not be construed as limited to the particular shapes of elements illustrated and described herein but are to include deviations in shapes that result, for example, from manufacturing. By way of example, an element illustrated or described as having rounded or curved features at its edges may instead have straight edges. Thus, the elements illustrated in the drawings are schematic in nature and their shapes are not intended to illustrate the precise shape of an element and are not intended to limit the scope of the described embodiments. Regarding the lapping process described herein, manufacturing tolerances in the lapped surface are to be expected.

The detailed description set forth below in connection with the appended drawings is intended as a description of various exemplary embodiments and is not intended to represent the only embodiments that may be practiced. The detailed description includes specific details for the purpose of providing a thorough understanding of the embodiments. However, it will be apparent to those skilled in the art that the embodiments may be practiced without these specific details. In some instances, well-known structures and components are shown in block diagram form in order to avoid obscuring the concepts of the embodiments. Acronyms and other descriptive terminology may be used merely for convenience and clarity and are not intended to limit the scope of the embodiments.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments include the described components, structure, features, functionality, processes, advantages, benefits, or modes of operation.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

As used herein, the terms "comprises", "comprising,", "includes" and/or "including", when used herein, specify the presence of the stated features, integers, steps, operations, elements, and/or components, but do not preclude the presence or addition of one or more other features, integers, steps, operations, elements, components, and/or groups thereof.

Furthermore, relative terms, such as "front" or "back" may be used herein to describe one element's relationship to another element as illustrated in the drawings. It will be understood that relative terms are intended to encompass different orientations of an apparatus in addition to the orientation depicted in the drawings. By way of example, if an apparatus in the drawings is turned over, elements described as being on the "front" side of other elements would then be oriented on the "back" side of the other elements. The term "front", can therefore, encompass both an orientation of "front" and "back," depending of the particular orientation of the apparatus.

In the following detailed description, various embodiments will be presented in the context of apparatus and methods used in the manufacture of a slider used for magnetic recording media. Using the electrical lapping guide described below, a back side surface of the slider may be within acceptable tolerance for a dimension between the back side surface and a waveguide section. Various embodiments are well suited to an apparatus and methods for lapping a back side surface of a slider for a magnetic recording device. However, those skilled in the art will realize that these aspects may be extended to preparing a surface of other types of substrates and devices. For example, various embodiments may be used in the manufacture of any other suitable articles that require a preparation of a surface to meet precise dimensions. Accordingly, any reference to a specific electrical lapping guide apparatus or method is intended only to illustrate the various embodiments, with the understanding that such embodiments may have a wide range of applications.

In an embodiment, an apparatus includes a slider bar, comprising a head part and a pair of sliders separated by the head part, each of the sliders having an air bearing surface (ABS) and a back side opposite the ABS, the head part comprising an electrical lap guide having a pair of terminals and a conductive material extending between the terminals, the conductive material being arranged with the head part such that the resistance between the terminals will increase during the lapping of the back side of the sliders. An embodiment of the apparatus may include the head part having a bond pad connected to a first terminal of the electrical lap guide, and the second terminal of the electrical lap guide connected to ground via the slider substrate, or a ground pad on the head part. An embodiment of the apparatus may further include connecting the bond pad on the head part to an external measurement device to monitor the resistance of the electrical lap guide during the lapping.

FIG. 1 shows a schematic diagram 100 with a top view perspective of a relative position for a waveguide portion on an exemplary read/write slider 102 with respect to the back side of the slider. The critical height dimension 112 shown in FIG. 1 is based on the precise distance required for proper coupling of the laser input to the light waveguide at the back side 114. A laser diode (not shown) may be mounted on the back side 114 of the slider for coupling to the waveguide section 110. As shown, the back side 114 surface is opposite of the ABS 116. Although not shown, a near field transducer may be coupled to the waveguide section 110 in a manner that enables the optical energy of the laser light to be converted to heat, and to generate a hot spot on the media that is small enough for discretely focusing on the very small space reserved for the bit during the data writing. Instead of lap-and-look technique, a closed loop lapping for providing better precision is described below. The waveguide section 110 as shown may be, at least in part, a testing feature to allow the slider to be tested for satisfying laser coupling requirements. The waveguide section 110 on the slider may be etched out of alumina, and then filled with gold and silicon dioxide to couple the light energy to the near field transducer for the required heat generation of the HAMR device during the writing process.

Figure 2:
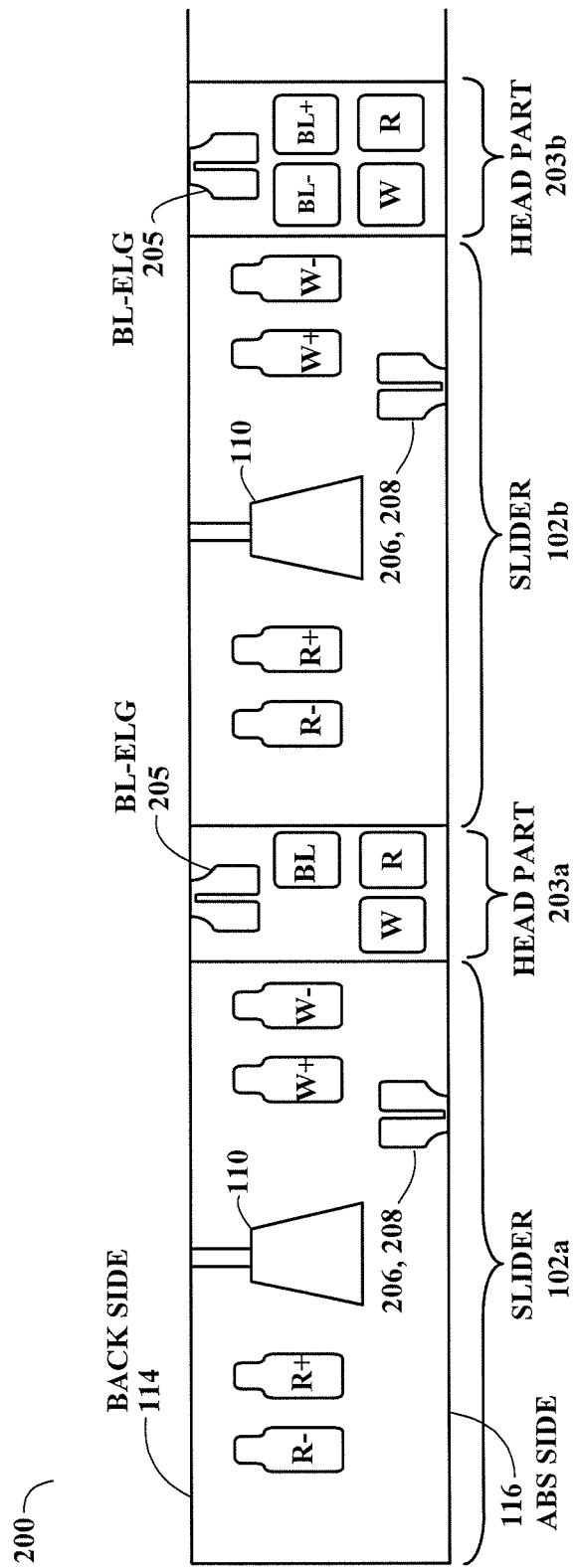
FIG. 2 shows a section of a slider bar that has a pair of sliders and a pair of head parts, each head part including a back side electrical lapping guide (BL-ELG) element.

FIG. 2 shows a layout of a slider bar section 200 layout that has an array of pads used for recording devices and auxiliary devices, including electrical lapping guide (ELG) elements, used during the lapping process at the ABS 116 of the slider, and for a separate lapping process at the surface of the back side 114 of the slider bar 200. The slider bar section 200 as shown in FIG. 2 illustrates a section of the entire slider bar, which includes a first slider section 102a, a second slider section 102b, and head parts 203a, 203b between the slider sections. The head parts 203a, 203b are used for placement of test pads, and will be cut away and discarded in subsequent fabrication steps to create the individual sliders. The slider bar 200 is created following fabrication on a wafer layout to create rows and columns of recording devices, as the wafer is then cut into individual bars. Each slider 102a, 102b includes a reader ELG element R-ELG 206, and a writer ELG element W-ELG 208, which are shown as vertically stacked on different layers. Alternatively, the R-ELG 206 and W-ELG 208 may be disposed on the slider according to a different arrangement, such as adjacent to each other on a common layer, for example. The slider 102a, 102b has several bond pads, including reader bond pads R− and R+ that are connected via the slider to the reader head terminals, and writer bond pads W− and W+ are connected via the slider to the writer head terminals.

The slider head part 203a, 203b may have up to four bond pads in each head. Two different example configurations are illustrated in FIG. 2, either of which may be implemented exclusively for the entire slider bar, or both as a combination. As shown in FIG. 2, the head part 203a includes a bond pad R which may be connected via the slider 102a to the reader ELG (R-ELG) 206. A bond pad W may be connected to the writer ELG (W-ELG) 208, and a bond pad BL may be connected to the back side lap ELG (BL-ELG) 205. The head part 203b shows a variation for the bond pads, to include a pair of back side lap pads BL− and BL+. Each of the head parts 203a, 203b shown in FIG. 2 includes a back side lag ELG (BL-ELG) 205. Each BL-ELG 205 is formed by two terminal pad extensions, with conductive material between the terminal pad extensions providing a measurable resistance between them. The conductive material extends to the back side surface 114 of the slider bar 200, such that during the lapping of the back side surface 114 of the slider bar 200, the measured resistance will increase according to an expected resistance curve (i.e., an analog signal inversely proportional to the stripe height, which is height of the conductive material on the BL-ELG 205 as the lapping progresses). Once the measured resistance reaches a predetermined value, the lapping is terminated.

The first terminal of the BL-ELG 205 may be connected to a grounded substrate. For example, where a head part does not have a bond pad G, as shown in the head part 203a in FIG. 2, the first terminal of the BL-ELG 205 may be connected to the grounded substrate within the head part body. Alternatively, the first terminal of the BL-ELG 205 may be connected to a back side lap pad BL−, such as shown in the head part 203b in FIG. 2. The pad BL− may be connected to a grounded substrate, or may only be a connection to the first terminal of the BL-ELG 205 and ungrounded. In yet another alternative, the first terminal of the BL-ELG 205 may be connected to a bond pad on the slider, such as bond pad W−, which is in close proximity to the head part 203a. The second terminal of the BL-ELG 205 may be connected to the back side lap pad BL+ either internally via the head part body during layer fabrication or as an external bond after layer fabrication. Alternatively, the second terminal of BL-ELG 205 may be connected directly to the BL+ pad. For the head part 203a, the lapping signal is read by connecting an external measurement device across the bond pad BL and the ground common to the slider substrate. For the head part 203b, the lapping signal is read by connecting an external measurement device across the back side lap pads BL− and BL+.

Figure 3:
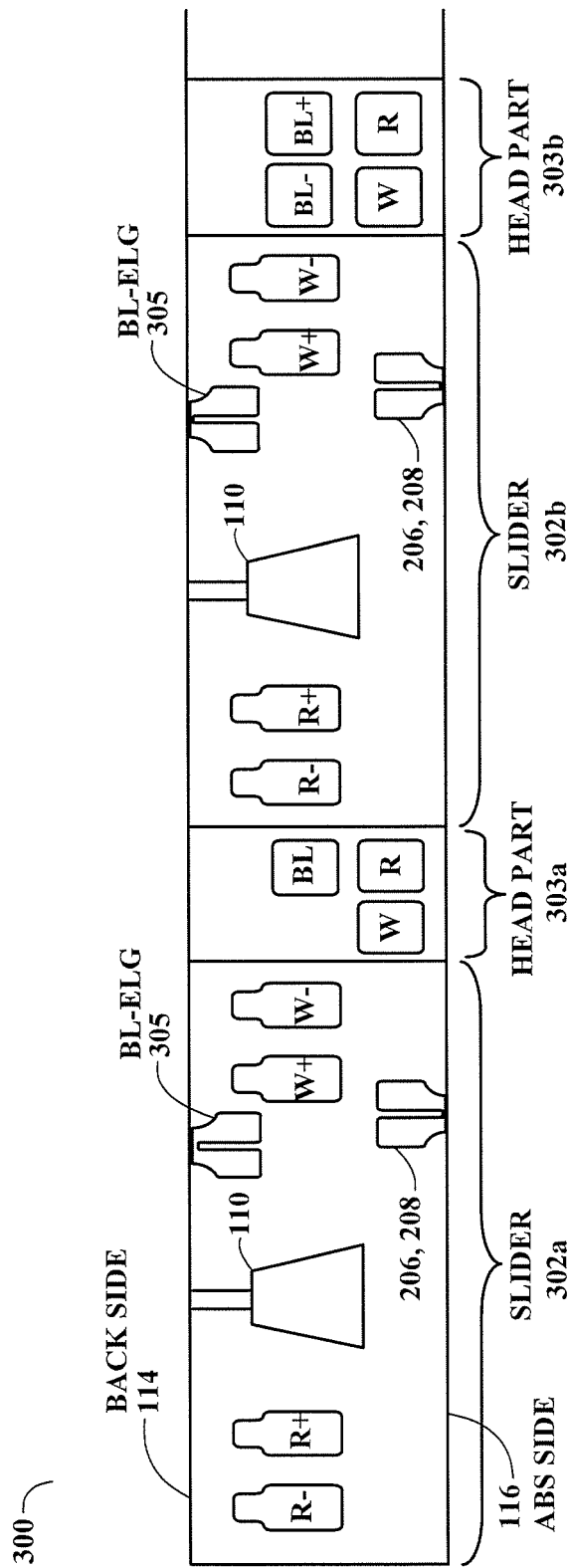
FIG. 3 shows a section of a slider bar that has a pair of sliders and a pair of head parts, each slider part including a back side electrical lapping guide (BL-ELG) element.

FIG. 3 shows another embodiment of a slider bar 300 in which a BL-ELG 305 is mounted on the back side surface 114 of slider 302a, and a BL-ELG 305 is mounted on the back side surface 114 of slider 302b. The first terminal of the BL-ELG 305 may be connected to a grounded substrate within the head part body. Alternatively, the first terminal of the BL-ELG 305 may be connected to a back side lap pad BL−, such as shown in the head part 303b in FIG. 3. The second terminal of the BL-ELG 305 may be connected to the back side lap pad BL+ on head part 303a, 303b either internally via the head part body during layer fabrication or as an external bond after layer fabrication. Alternatively, the second terminal of BL-ELG 305 may be connected directly to the bond pad BL+. The lapping signal is read by connecting an external measurement device across the bond pad BL and the ground common to the slider substrate for the head part 303a. For the head part 303b, the lapping signal is read by connecting an external measurement device across the bond pad BL− and the bond pad BL+.

While FIG. 2 shows the electrical lapping guide 205 on the head part 203a, 203b, and FIG. 3 shows the electrical lapping guide 305 on the slider 302a, 302b, an alternative embodiment may include a combination of both placements of the electrical lapping guide (i.e., at least one electrical lapping guide on a head part, and at least one lapping guide on a slider of the slider bar 200, 300).

The BL-ELG 205, 305 is based on a metallic layer resistance measurement. The BL− ELG 205, 305 may be a resistor that functions as a switch to create an open circuit when the lapping has removed the last amount of material that forms the BL-ELG 205, 305 resistor. The open circuit may be used to indicate an end point for the lapping has been reached, triggering termination of the lap process. The BL-ELG 205, 305 may be connected in parallel with a high resistance resistor to improve detection of a true open circuit and distinguish from a false open circuit due to premature failure of the connection between the electrical lapping guide terminals.

FIGS. 4A and 4B illustrate a time lapse for lapping the back side slider surface 114 using the BL-ELG 205, 305. In FIG. 4A, the BL-ELG 205, 305 includes a region 402 that forms a conductive path between a pair of terminals 404. As surface 114 is lapped, the region 402 is removed along with the removed surface. As shown in FIG. 4B, surface 114 and region 402 are equally reduced. During the lapping process, resistance is measured across the pair of terminals 404 to precisely monitor how much material has been removed from the surface 114 based on a corresponding change in resistance proportional to the removed region 402. As the conductive path in region 402 is reduced, the measured resistance will increase according to a characteristic curve.

In another embodiment, a method for lapping a slider bar 200, 300 having a head part 203a, 203b, 303a, 303b and a pair of sliders 102a, 102b, 302a, 302b separated by the head part provides the desired dimension 112 for the slider back side 114. Each of the sliders 102a, 102b, 302a, 302b has an air bearing surface (ABS) and a back side surface opposite the ABS. Each of the sliders 102a, 102b, 302a, 302b has a reader element 206 and a writer element 208 of a magnetic head for use in a magnetic hard disk drive. The method includes cutting a slider bar 200, 300 from a wafer and lapping the back side of each of the sliders 102a, 102b, 302a, 302b while measuring resistance across the BL-ELG 205, 305 on the slider bar. The conductive material 402 of the BL-ELG 205, 305 may be arranged on the slider bar 200, 300 such that the resistance between the terminals 404 increases during a lapping of the back side 114 of the sliders 102a, 102b, 302a, 302b. The BL-ELG 205, 305 may be placed on the head part 203a, 203b, or on the slider 302a, 303a, or a combination of both. The lapping may be terminated when all the conductive material 402 is removed or when the measured resistance reaches a resistance threshold. One of the terminals 404 of the BL-ELG 205, 305 may be connected to a bond pad on the head part 203a, 203b, 303a, 303b. The other terminal 404 of the BL-ELG 205, 305 may be connected to a second bond pad on the head part 203a, 203b, 303a, 303b. The BL-ELG 205, 305 may have a resistor in parallel with the conductive material 404. Alternatively, a resistor may be connected in parallel with the conductive material 404 of the BL-ELG 205, 305. After the lapping is completed, a laser may be mounted on the slider back side surface 114.

The various embodiments of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. A slider bar, comprising:
    a head part;
    a pair of sliders separated by the head part, each of the sliders having an air bearing surface (ABS) and a back side surface opposite the ABS, each of the sliders comprising a reader element and a writer element exposed to the ABS for use in a magnetic hard disk drive; and
    an electrical lapping guide having a pair of terminals and a conductive material extending between the terminals, the conductive material being arranged on the slider bar such that the resistance between the terminals increases during a lapping of the back side of the sliders.

2. The slider bar of claim 1, wherein the head part comprises the at least one electrical lapping guide.

3. The slider bar of claim 1, wherein at least one of the sliders comprises the electrical lapping guide.

4. The slider bar of claim 1, wherein the electrical lapping guide is configured to trigger the termination of the lapping when all the conductive material is removed.

5. The slider bar of claim 1, wherein the electrical lapping guide is further configured to trigger the termination of the lapping when the conductive material remaining during the removal of the conductive material reaches a resistance threshold according to a measurement during the lapping.

6. The slider bar of claim 1, further comprising a substrate configured to be connected to ground, wherein the head part further comprises a bond pad, and wherein a first one of the terminals is connected to the bond pad.

7. The slider bar of claim 6, wherein the head part further comprises a second bond pad, and wherein the first one of the terminals is connected to the second bond pad.

8. The slider bar of claim 1, wherein the electrical lapping guide further comprises a resistor in parallel with the conductive material.

9. A method for lapping a slider bar, the slider bar having a head part and a pair of sliders separated by the head part, each of the sliders having an air bearing surface (ABS) and a back side surface opposite the ABS, each of the sliders comprising a reader element and a writer element exposed to the ABS for use in a magnetic hard disk drive, the method comprising:

cutting a slider bar from a wafer; and lapping the back side of each of the sliders while measuring resistance across an electrical lapping guide on the slider bar, the electrical lapping guide having a pair of terminals and a conductive material extending between the terminals, the conductive material being arranged on the slider bar such that the resistance between the terminals increases during a lapping of the back side of the sliders.

10. The method of claim 9, wherein the head part comprises the electrical lapping guide.

11. The method of claim 9, wherein at least one of the sliders comprise the electrical lapping guide.

12. The method of claim 9, further comprising terminating the lapping when all the conductive material is removed.

13. The method of claim 9, further comprising terminating the lapping when the measured resistance reaches a resistance threshold.

14. The method of claim 9, wherein the head part further comprises a bond pad, further comprising connecting a first one of the terminals to the bond pad.

15. The method of claim 14, wherein the head part further comprises a second bond pad, further comprising connecting the second one of the terminals to the second bond pad.

16. The method of claim 9, wherein the electrical lapping guide further comprises a resistor in parallel with the conductive material.

17. The method of claim 9, further comprising connecting a resistor in parallel with the conductive material of the electrical lapping guide.

18. The method of claim 9, further comprising:

mounting a laser on the back side surface of each of the sliders after the lapping is completed.

19. The slider bar of claim 1, further comprising a waveguide section, wherein the electrical lapping guide controls the height of the back side of the sliders, and the back side of the sliders is configured for coupling the waveguide section to a laser diode.

\* \* \* \* \*